J. C. APPENZELLER.
Apparatus for Making Vinegar.

No. 203,574.  Patented May 14, 1878.

UNITED STATES PATENT OFFICE.

JOHN C. APPENZELLER, OF CINCINNATI, OHIO.

IMPROVEMENT IN APPARATUS FOR MAKING VINEGAR.

Specification forming part of Letters Patent No. 203,574, dated May 14, 1878; application filed October 30, 1877.

*To all whom it may concern:*

Be it known that I, JOHN C. APPENZELLER, of Cincinnati, in the county of Hamilton and State of Ohio, have invented certain new and useful Improvements in Apparatus for Making Vinegar; and the following is a full, clear, and exact description thereof, reference being had to the accompanying drawings, and to the letters of reference marked thereon, which form a part of this specification.

Figure 1:
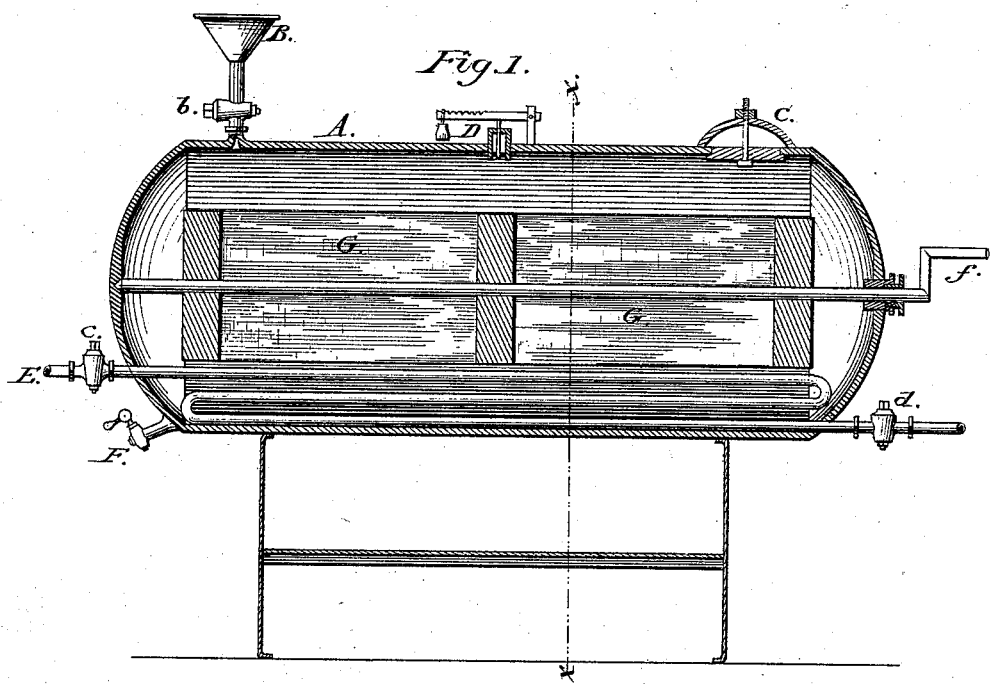
Figure 2:
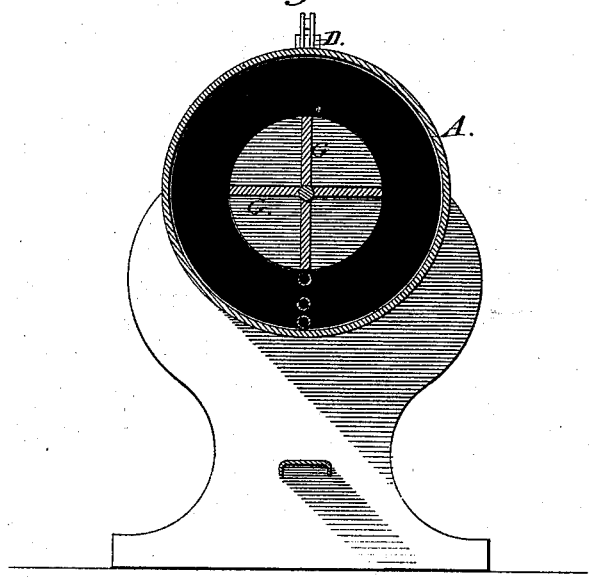

Referring to the drawings, Figure 1 represents a vertical longitudinal section of my improved apparatus, and Fig. 2 represents a transverse section of the same, taken on line $x$ $x$ of Fig. 1.

Similar letters of reference indicate like parts in both figures.

My invention has for its object to furnish an improved apparatus for manufacturing vinegar from the fermented juice of all kinds of fruit; and it consists of a cylindrical-shaped vessel, having a series of longitudinally-arranged pipes passing through the lower part of the same, said vessel being also provided with a suitable inlet and outlet pipe, a safety-valve, and a longitudinal shaft through the center for carrying dashers to agitate the liquid contained in the said vessel, all as will be hereinafter more fully described, and pointed out in the claim.

In the drawings, A represents a cylindrical-shaped vessel, constructed preferably of copper, and provided with a centrally-arranged longitudinal shaft, $f$, carrying dashers G, for agitating the liquid in the vessel, said shaft having its journals arranged in suitable bearings, and provided with a crank upon the outer end for operating the same. B represents a funnel-shaped inlet-pipe, provided with stop-cock $b$ for introducing the fermented liquid into the vessel A, and F represents an outlet-pipe, provided with a stop-cock for emptying the vessel of its contents.

The vessel A is also provided with a safety-valve, D, and man-hole C at the top, and with a series of pipes, E, bent parallel with each other and longitudinally arranged at the lower part of the vessel, and provided with a stop-cock, $c$, at the inlet portion, and with a stop-cock, $d$, at the outlet of the same, as fully shown in Fig. 1.

The construction of my apparatus being as described, I will now proceed to explain the manner of producing the vinegar.

The juice of fruits, mixed with a small quantity of yeast, is placed in a suitable vessel, subjected to about 70° Fahrenheit, and left to ferment. When the fermentation is over the juice is then filtered through a woolen cloth and introduced through the opening B into the cylindrical tank A, to the pipes E of which is then introduced a current of steam having from ten to twenty pounds pressure. The dashers G are then set in motion, and the fermented liquor agitated and boiled. The contents of the tank are then left undisturbed for an hour, when the pipes E are connected to a suitable pump to force a continuous flow of cold water through the same, and the dashers again put in motion until the liquid is nearly cold. The liquid is then drawn off through the stop-cock F, and again filtered through woolen cloth, then returned to the tank and mixed with one-eighth part of already-prepared vinegar, and subjected to 180° Fahrenheit for two days; then the dashers are agitated and the contents thoroughly mixed, and afterward clarified with whites of eggs or other suitable material.

By means of my improved apparatus I am enabled to obtain pure vinegar, which will not mold or lose its properties or acidity.

I am aware of the patent granted to J. J. Craven under date of September 17, 1872, and No. 131,429, and do not therefore desire to claim the construction shown therein; but,

Having thus described my invention, what I claim as new and useful is—

The hereinbefore-described apparatus for making vinegar, consisting of the vessel A, having inlet-pipe B, drain-pipe F, safety-valve D, man-hole C, and provided with a central longitudinal shaft, $f$, carrying dashers G, and a series of bent pipes, E, having inlet $c$ and outlet $d$, substantially as and for the purpose described.

JOHN C. APPENZELLER.

In presence of—
WM. PORTER,
C. A. WATSON.